Aug. 20, 1929.　　　O. A. SHANN　　　1,724,973
TESTING DEVICE
Filed July 24, 1925
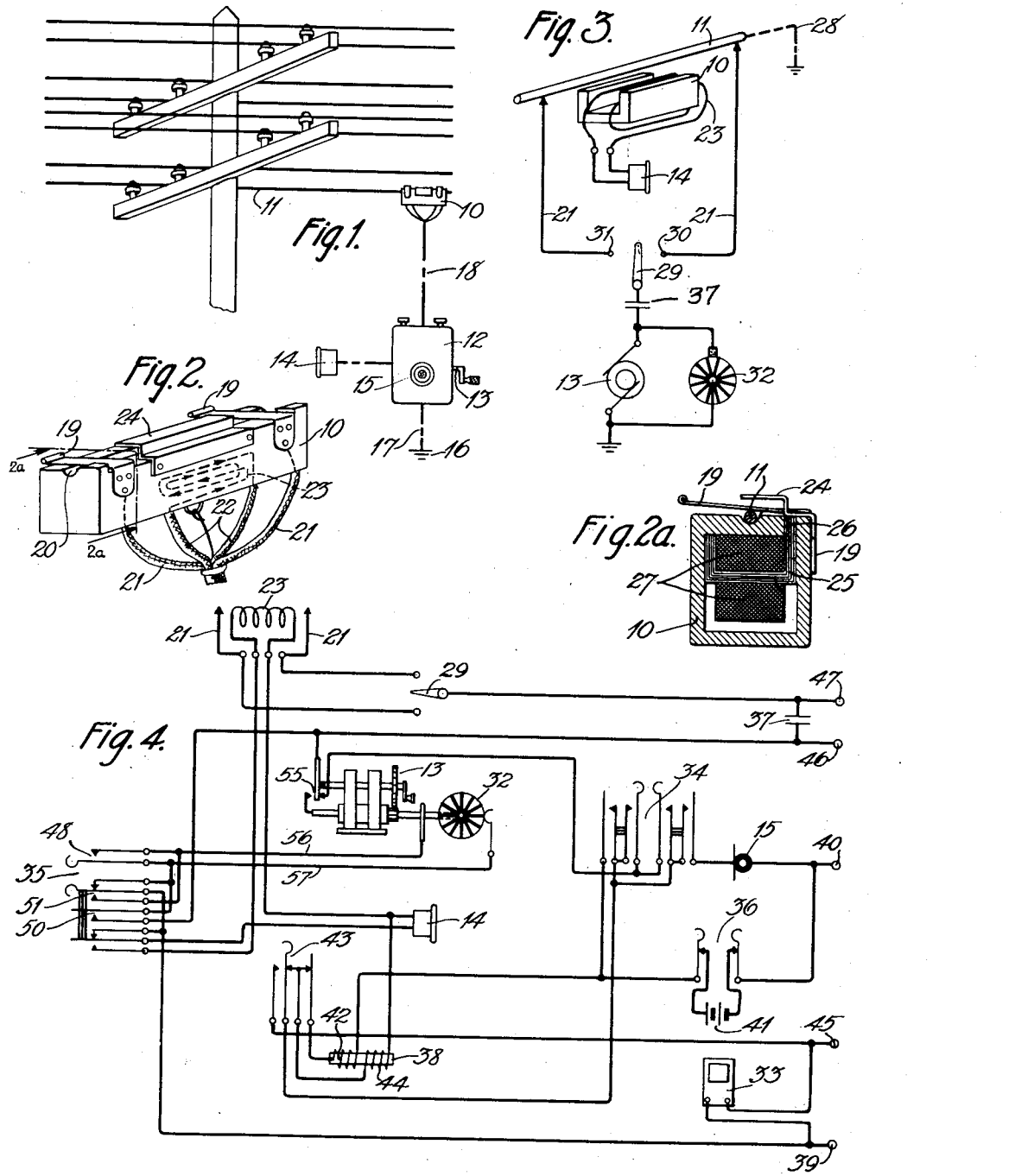
Inventor:
Oscar A. Shann
by C. W. Adams. Atty.

Patented Aug. 20, 1929.

1,724,973

UNITED STATES PATENT OFFICE.

OSCAR A. SHANN, OF BROOKLYN, NEW YORK, ASSIGNOR TO WESTERN ELECTRIC COMPANY, INCORPORATED, OF NEW YORK, N. Y., A CORPORATION OF NEW YORK.

TESTING DEVICE.

Application filed July 24, 1925. Serial No. 45,786.

This invention relates to methods and means for locating faults in line conductors and particularly to an arrangement and combination of circuits and apparatus adapted to be assembled as a portable set for use by a lineman.

The object of the invention is to provide a simple and certain means for the location of faults in circuits, particularly telephone and telegraph long line circuits.

A feature of the invention is the provision of a removable attachment whereby a fault in one of a plurality of wires may be quickly ascertained and its location determined.

Another feature of the invention is the provision of novel switching device whereby the direction of a fault with relation to the position of a lineman may be ascertained without shifting any apparatus or changing the position of associated detecting means.

A further feature of the invention enables a lineman to connect a talking circuit through the set or to merely close a listening circuit and hence prevent draining the battery supply for talking and at the same time cut down the impedance of a secondary circuit to make listening easier.

A further feature is the provision of a set of switching devices whereby currents of varied frequency may be impressed on a line to be tested depending upon whether an open wire or a loaded line is being tested.

Heretofore various methods and means have been employed by telephone repair men for detecting faults in open wire lines. Usually an exploring coil was used by the test man in combination with an ordinary hand generator, the test man shifting his exploring coil from one side of a test lead to the other or using leads that were shifted from one wire to another in order to locate the conductor needing repair. In consequence much time was lost and under severe or cold weather the lineman was under great difficulty in making tests, especially where poles had to be climbed to reach open wires. By use of this invention, however, the lineman may have a set strapped about him and upon attaching his locating device to a wire needs shift its position no further. Further features not specifically enumerated which are designed to make testing simpler and more expeditious will be apparent from the following specification and accompanying drawings in which Fig. 1 illustrates a plurality of open wire lines mounted on a pole to one of which a detecting and testing device in accordance with the invention is associated.

Fig. 2 illustrates the attachable detecting unit and its novel clamping means enabling it to be easily attached and removed from a wire.

Fig. 2A is a cross section of the detecting unit and the novel construction providing for induction from a wire to be tested to a core of an exploring coil.

Fig. 3 shows a simple circuit in schematic form illustrating the detecting feature of the set.

Fig. 4 shows the combination of talking, listening, signalling and testing circuits used in the test set and is intended to illustrate the combination of apparatus used and the arrangement of the circuits in detail.

Similar designations relate to similar parts in all figures.

Referring to Fig. 1, 10 represents an attachable detecting unit associated with and in direct contact with open wire line 11 which is of the usual type found throughout the country used for telegraph or telephone purposes. 12 represents the test set which comprises among its equipment a generator 13, the crank of which is shown, a receiver 14 and transmitter 15. It may be noted that test set 12 is of the portable type and may be designed compactly, and easily carried by a repair man. Ground 16 merely shows that if the set were used to locate a ground, it may be connected to ground by means of an ordinary lead 17 in order to close through the usual grounding circuit. Broken conductor 18 shows that intermediary switching devices may be used to control the connection of the detecting attachment 10 to the set as desired.

Fig. 2 shows the attachment detecting device more in detail. Spring prongs 19 are attached to opposite ends of the device and are so designed that upon mounting the device on a wire the wire will slip under prongs 19 and come to rest in groove 20; of the device so that good contact exists between spring prongs 19 and the wire resting in the groove. Leads 21 are attached to the prongs and hence are conductively associated with the wire resting thereunder. Leads 22 are connected to an exploring coil 23 positioned inside the device, the conductive means for inductively influencing the exploring coil being metal cap 24 which is in contact with the core of the coil as is clearly illustrated in Fig. 2ᴬ.

Fig. 2ᴬ illustrates a cross section of the structure of the device and particularly the construction of the coil and the relation of contact piece 24 to the core. It may be seen that core 25 of the exploring coil has its upper portion 26 in contact with the mounted base of cap contact piece 24. Cap 24 is so designed that upon the attachment of the device to a wire by means of clasping the wire beneath prongs 19, the wire will be positioned under and in inductive relation to cap 24. Inasmuch as cap 24 is closely associated with core 25, and is of the same material, it may actually be considered part of the core. As a result, the wire will be practically enclosed by the core, and the inductive relation between core and wire will be greater and more effective than ordinarily. 27 shows the usual windings of a suitable exploring coil.

Fig. 3 illustrates the detecting feature of the invention in simple form. Considering wire 11 is grounded at point 28 and that the lineman after receiving instruction from his wire chief for example, proceeds to a point nearby on the line and desires to determine in what direction the ground lies from his position. He will therefore attach the device to wire 11 and commence to test. He will first shift switch 29 to make contact with terminal 30. He will then actuate generator 13 and listen with receiver 14. The circuit may easily be traced from ground through point 28, right-hand conductor 21, terminal 30, switch 29, generator 13 to ground. Not hearing any sound he will know that the fault lies in that direction. To make sure, however, he will shift the switch so that it now makes contact with contact 31. He will again actuate generator 13 and a circuit will now be closed from ground, point 28, conductor 11, left-hand conductor 21, terminal 31, switch 29 through the generator 13 to ground. Inasmuch as the circuit is closed through 11 and passes over the exploring coil the generator circuit induces a current in the exploring coil which is closed through receiver 14 and the lineman will know that the fault lies to his right provided, of course, that the relative positions in the drawing show the relative position of his set to the fault in the case illustrated. Interrupter 32 shown in parallel with the generator is provided for a purpose that will more fully be explained hereinafter.

Proceeding to a consideration of Fig. 4, 23 represents the exploring coil of the detecting device; 21 are the leads associated with prongs 19; 29 is a switching means for determining in what direction the fault lies with respect to the position of the repair man; 13 is the hand generator used for sending out tone on the line; 32 is the interrupter in shunt of generator 13; 14 is a receiver; 15 is a transmitter; 33 is a buzzer used by the lineman to enable him to be called by a central office or other agency; 34 and 35 are keys used respectively for talking and listening and fault locating; 36 is a usual battery connecting key and 37 is a condenser of suitable capacity adapted to be used in conjunction with interrupter 32 to aid in the more efficient transmission of signal pulses over the line for fault detection purposes.

Assuming that a lineman in the field desires to talk to his wire chief, for example, or central office, he will actuate key 34 so that the right-hand contacts are closed. The transmitter circuit will then be closed through battery 41 and induction coil 38, in series with receiver 14. It is assumed, of course, that the line is connected by suitable conductors to connecting terminals on the set such as 39 and 40. The circuit is as follows: in from the line to terminal 40, battery key 36 and battery 41, primary 42 of the induction coil, normal right-hand contacts of key 43, secondary 44 of the induction coil through the receiver 14 and lower normal closed contact of key 35 to terminal 39 and out to the line. If, however, the repair man wants to listen only, he would throw key 34 to the left so that the left-hand contacts would in this case be closed. This would serve to open the transmitting circuit, cause the primary of the induction coil to be shunted, prevent draining battery 41 for transmission purposes and cut down the impedance of the secondary circuit and by increasing the volume of current through the receiver make listening easier. This circuit is as follows: in from the line, terminal 39, over normally closed contacts of key 35, through receiver 14, secondary 44 of the induction coil, normally closed left-hand contacts of key 43, left-hand contacts of key 34, through battery 41, and the key 36 to contact 40 and back to the line circuit. The transmitter circuit was short-circuited for this operation upon the actuation of key 34 to its left position as follows: primary 42 of the induction coil, left-hand closed contacts of key 34, back to normal closed left-hand contacts of key 43, right-hand closed contacts of key 43 to primary winding 42. The transmitter circuit is hence short and cuts down the amount of current drained from the battery. Inasmuch as the lineman may not be able to renew his battery or be in a position to obtain a suitable current source when necessary it is of primary importance that drains on the battery be avoided and battery current conserved as much as possible in order to have the set at a high state of efficiency. There are times as, for example, when a lineman in the field is awaiting instruction from a central office when it would be wasteful and inadvisable to keep the talking and listening circuits connected to a line. Means are provided therefore to enable the repair man to be called in addition to those which enables him to call.

By means of buzzer 33 an outside agency such as a central office may send out a battery current which will be connected to terminals 45 and 39 and signal the repair man. The circuit through the buzzer is obvious. If the calling party has no battery supply available the repair man will actuate key 43 to close the normally open left-hand contacts and battery 41 will then be included in the buzzer circuit as follows: in from the line, terminal 40, key 36 and battery 41, through left-hand closed contacts of key 34, left-hand closed contacts of key 43, through buzzer 33, terminals 39 and out to the line.

The testing circuits will now be explained in detail. Considering that a lineman who has attached his detecting device to a line to be tested, now desires to find the position of the fault. He will actuate key 35 downward and close the normally open contact. He will then operate hand generator 13 and will receive the usual signal tone through receiver 14 depending on whether switch 29 is in one position or other as has heretofore been explained. Upon the shifting of key 35 it will be noted that the commutator is placed in parallel with generator 13 or in other words, shunts the generator. This arrangement whereby the generator is alternately short-circuited (and condenser 37 is alternately allowed to discharge in combination therewith) constitutes a feature of paramount importance in testing and tends to produce a test tone in the receiver of greater volume than is ordinarily the case. This makes for efficiency in the functioning of an exploring coil not heretofore obtained to a similar degree.

The lineman will first connect terminal 39 to ground or to one of two short-circuited lines depending upon whether the trouble is due to ground or to a short circuit. The fault locating circuit would then be as follows: conductor 21, switch 29, condenser 37, operated contacts 55 of generator 13, and alternate circuits as follows to terminal 39 and ground or another wire with which the wire being tested is shorted; first—conductor 56, operated contacts 51 of key 35 to terminal 39 or second—a segment of commutator 32, conductor 57, operated contacts 50 of key 35, contacts 55 of generator 13, conductor 56, contacts 51 of key 35 to terminal 39. If the switch is so thrown that the conductor 21 farthest from the fault is included in the circuit, a tone will be induced by means of the exploring coil 23 and the usual signal will be heard through receiver 14 in an obvious receiver circuit including coil 23 and lowest alternate contacts of key 35. 32 is placed in shunt of generator 13 and therefore produces a series of wave cycles of desired form tending to produce greater volume and efficiency. The wave form produced by the generator is shunted at desired intervals and at any desired point in its development so that the amplitude of the wave transmitted over the line is controlled within desired limits. Each time the generator is short-circuited by means of the insulated segments of the commutator the test circuit is broken and condenser 37 normally being charged while the generator is associated with the line, now has time to discharge. In other words, a continually and alternately charging and discharging of condenser 37 takes place in combination with the continually short-circuiting of the generator current produced. In Patent No. 1,672,933, issued to Edwards and Niles on June 12, 1928, the form of the train of waves produced and the means of producing and controlling them as well as the benefits derived will be more fully disclosed.

Key 48 is provided so that current of a desired frequency such as the usual 16 cycle telephone current, may be transmitted over a line by the lineman. By actuating key 48 commutator 32 will be short-circuited through the contact of the key and the current, 16 cycle ringing current, will therefore not be transformed to one of greater frequency. If, however, the lineman desires to ring over a line which is loaded as for example a line having repeating coils therein or other resistance means, the lineman will leave the key in normal position. Commutator 32 will then be in series with the generator and "chop up" the usual 16 cycle current so that current of greater frequency such as the usual 133 cycle current will be produced.

If the line over which the lineman desires to transmit such ringing current is one to which battery current is connected, then terminal 47 will be connected thereto whereas if the line is not sending out battery then there will be no object in placing condenser 37 in series therewith, inasmuch as this would tend to reduce the efficiency of the circuit, and in this case the line would be connected to terminal 46.

It may be thus seen that by applicant's combination as aforesaid the lineman may accurately and expeditiously locate trouble and at the same time have means at his disposal for signalling over loaded or unloaded lines or lines associated with or not connected to battery sources; for speaking thereover, for receiving signals, and for changing the frequency of generator current as occasion demands.

What is claimed is:

1. A test set for locating faults in electrical lines comprising an encased winding, means at the extremities thereof for positioning said winding parallel with a line to be tested, said means comprising terminals for making electrical connection with said line, a source of current adapted to transmit a current of a desired character over said line, and a switching means whereby said current may be alternately connected to said terminals whereby the direction of a fault in said line with respect to the position of the test set may be determined.

2. Means for locating the direction of an unstandard condition on a line comprising a coil to be placed in physical proximity and in inductive relation to said line, said coil being encased in a non-conducting cover, a source of current of a nature capable of being detected by said coil when flowing through said line past said coil, two conducting terminals mounted on said cover, one at either end of said coil, and means for quickly transferring said circuits of current from one to the other of said terminals.

3. A testing means for locating faults in electrical conductors comprising a container adapted to be positioned parallel with and beneath a line to be tested, a winding in said container adapted to receive induced currents, a magnetic core associated with said winding and in contact with means attached to said container and adapted to be positioned in inductive relation above said line, upon the association of said container with said line at a desired point, said core and last named means thereby substantially enveloping said line at said point, and a source of current of a nature capable of being detected by said winding when flowing through said conductor past said winding.

4. Fault locating means for use with open wire lines comprising a detecting device adapted to be placed in physical proximity and in inductive relation to a line to be tested, a coil in said device adapted to inductively receive currents passing through said line, two conducting terminals mounted on said device, a source of current, and a switching device for quickly transferring said source of current from one to the other of said terminals thereby ascertaining the position of a fault in said line with respect to the position of said device.

In witness whereof, I hereunto subscribe my name this 18th day of July, A. D. 1925.

OSCAR A. SHANN.